(12) United States Patent
Yoon et al.

(10) Patent No.: US 11,871,139 B1
(45) Date of Patent: Jan. 9, 2024

(54) MULTI-CAMERA RECORDING USING A VISUAL MEDIA RECORDING DEVICE

(71) Applicant: Meta Platforms, Inc., Menlo Park, CA (US)

(72) Inventors: Doheny Yoon, San Francisco, CA (US); Brandon Joseph Kieft, San Francisco, CA (US); Raj Vir, Beverly Hills, CA (US); George Lewis Kedenburg, III, San Francisco, CA (US); Nicolas Russell, Daly City, CA (US); Bruno Pereira Evangelista, San Carlos, CA (US); George Lam, San Francisco, CA (US); Alexandra Louise Krakaris, Lafayette, CA (US); Mitchell Kogan, San Francisco, CA (US); Nilesh Vinubhai Patel, Mountain View, CA (US); Houman Meshkin, Orinda, CA (US); Arielle Chapin, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 93 days.

(21) Appl. No.: 17/384,643

(22) Filed: Jul. 23, 2021

(51) Int. Cl.
*H04N 5/77* (2006.01)
*H04N 5/265* (2006.01)
*H04N 23/90* (2023.01)

(52) U.S. Cl.
CPC ............... *H04N 5/77* (2013.01); *H04N 5/265* (2013.01); *H04N 23/90* (2023.01)

(58) Field of Classification Search
None
See application file for complete search history.

(56) References Cited

U.S. PATENT DOCUMENTS

| 2015/0358650 | A1* | 12/2015 | Kulkarni | H04N 21/435 386/239 |
|---|---|---|---|---|
| 2018/0233025 | A1* | 8/2018 | Modestine | G06T 7/292 |
| 2020/0120269 | A1* | 4/2020 | Shirmohamadi | H04N 5/272 |
| 2022/0294992 | A1* | 9/2022 | Manzari | H04N 23/633 |

* cited by examiner

*Primary Examiner* — Eileen M Adams
(74) *Attorney, Agent, or Firm* — McDermott Will & Emery LLP

(57) ABSTRACT

Methods, systems, and storage media for simultaneously recording multiple visual media using a plurality of cameras of a visual media recording device are disclosed. Exemplary implementations may: record a first visual medium using a first camera (e.g., a front-facing camera) of the plurality of cameras of the visual media recording device; record a second visual medium using a second camera (e.g., a rear-facing camera) of the plurality of cameras of the visual media recording device simultaneously with recording of the first visual medium, at least one of the first camera and the second camera utilizing face-tracking technology during recording; combine the first visual medium and the second visual medium into a single visual output during a post-recording process; and cause display of the single visual output.

20 Claims, 7 Drawing Sheets

MULTI-CAMERA RECORDING USING A VISUAL MEDIA RECORDING DEVICE

TECHNICAL FIELD

The present disclosure generally relates to recording visual media (e.g., images and/or videos, etc.). More particularly, the present disclosure relates to simultaneously recording multiple visual media utilizing a plurality of cameras of a visual media recording device, combining the multiple visual media post-capture, and causing display of a single visual output.

BACKGROUND

Visual media recording devices (e.g., mobile cellular devices having one or more cameras incorporated therewith) have become commonplace in first-world societies. One can rarely be present at a public venue of any kind and not see at least one individual utilizing a visual media recording device to record a photograph or video (of another person or persons or of themselves (often referred to as a "selfie")) or communicating with another person or persons using a visual media recording device to engage in an audio/video communication.

BRIEF SUMMARY

The subject disclosure provides for systems and methods for simultaneously recording multiple visual media utilizing a plurality of cameras of a visual media recording device. At least two cameras of a visual media recording device having a plurality of cameras may be simultaneously actuated and a visual medium (e.g., an image or a video) from each of the at least two cameras may be provided to a post-capture process. The multiple visual media received by the post-capture process may be combined into a single visual medium that includes at least a portion of the content of each of the multiple visual media received. In some aspects, one or more enhancements (e.g., changes) may be applied to the single visual medium to create an enhanced visual medium. The single visual medium (and/or the enhanced visual medium, when appropriate) may be caused to be displayed, for instance, in association with a social media platform and/or in association with a real-time video communication.

One aspect of the present disclosure relates to a method for simultaneously recording multiple visual media utilizing a plurality of cameras of a visual media recording device. The method may include recording a first visual medium using a first camera of the plurality of cameras of the visual media recording device. The method may include recording, simultaneously with recording of the first visual medium, a second visual medium using a second camera of the plurality of cameras of the visual media recording device. In some aspects, at least one of the first camera and the second camera may utilize face-tracking technology during recording. The method further may include combining the first visual medium and the second visual medium into a single visual output during a post-capture process, the single visual output including at least a portion of the content of each of the first visual medium and the second visual medium. Still further, the method may include causing display of the single visual output, for instance, in association with a social media platform and/or in association with a real-time video communication.

Another aspect of the present disclosure relates to a system configured for simultaneously recording multiple visual media utilizing a plurality of cameras of a visual media recording device. The system may include one or more hardware processors configured by machine-readable instructions. The processor(s) may be configured to record, during a real-time video communication, a first visual medium using a first camera of the plurality of cameras of the visual media recording device. In some aspects, the first camera may be front-facing relative to the visual media recording device. The processor(s) may be configured to record, simultaneously with recording of the first visual medium during the real-time video communication, a second visual medium using a second camera of the plurality of cameras of the visual media recording device. In some aspects, the second camera may be rear-facing relative to the visual media recording device. The processor(s) further may be configured to combine the first visual medium and the second visual medium into a single visual output during a post-recording process, the single visual output including at least a portion of the content from each of the first visual medium and the second visual medium. Still further, the processor(s) may be configured to cause display of the single visual output during the real-time video communication.

Yet another aspect of the present disclosure relates to a non-transient computer-readable storage medium having instructions embodied thereon, the instructions being executable by one or more processors to perform a method for simultaneously recording multiple visual media utilizing at least a portion of a plurality of cameras of a visual media recording device. The method may include recording a first visual medium using a first camera of the plurality of cameras of the visual media recording device. The method may include, simultaneously with recording of the first visual medium, recording a second visual medium using a second camera of the plurality of cameras of the visual media recording device. In some aspects, at least one of the first camera and the second camera may utilize face-tracking technology during recording. The method further may include combining the first visual medium and the second visual medium into a single visual output during a post-capture process, the single visual output including at least a portion of the content of each of the first visual medium and the second visual medium. Still further, the method may include causing display of the single visual output for instance, in association with a social media platform and/or in association with a real-time video communication.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1A:
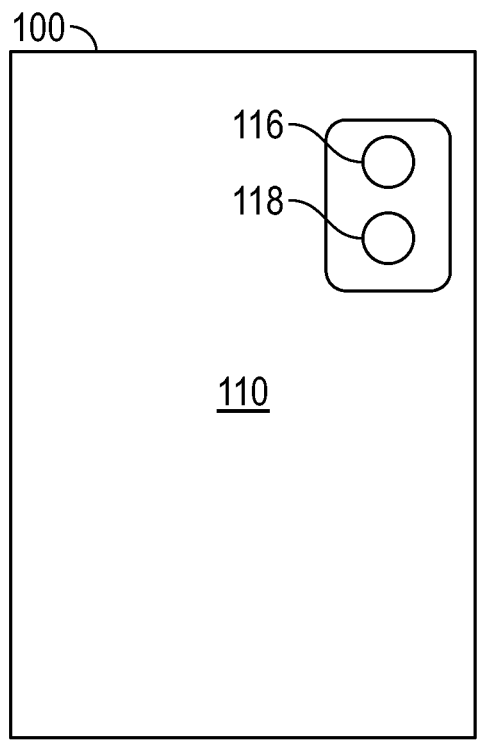
FIGS. 1A and 1B illustrate a rear view and a front view, respectively, of an exemplary visual media recording device (e.g., a mobile cellular device) having a plurality of cameras, that may be utilized in accordance with one or more implementations of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As previously set forth, visual media recording devices (e.g., mobile cellular devices having one or more cameras incorporated therewith) have become commonplace in first-world societies. One can rarely be present at a public venue of any kind and not see at least one individual utilizing a visual media recording device to record a photograph or video (of another person or persons or of themselves (often referred to as a "selfie")) or communicating with another person or persons using a visual media recording device to engage in an audio/video communication. Visual media recording devices having more than one camera incorporated therewith permit a user to alternate between views. For instance, upon actuation of a first camera of the visual media recording device, a first view may be displayed showing what is being (or may be) recorded on the rear-facing side of the visual media recording device (e.g., the side oriented away from a user holding, or otherwise utilizing, the visual media recording device). Upon actuation of a second camera of the visual media recording device, a second view may be displayed showing what is being (or may be) recorded on the front-facing side of the visual media recording device (e.g., the side oriented toward a user holding, or otherwise utilizing, the visual media recording device). At least a portion of the second view generally comprises an image or video of the user holding (or otherwise utilizing) the visual media recording device.

While visual media recording devices having multiple cameras and being configured to alternate between views recorded by the cameras permit more flexibility to users than visual media recording devices having only a single camera, such devices still permit only a single visual medium to be recorded at one time. Thus, a user is faced with having to select between recording, for instance, what s/he is viewing, or his/her reaction to what s/he is viewing but not both at the same time.

Implementations described herein address these and other problems by providing for systems and methods for simultaneously recording multiple visual media utilizing at least a portion of a plurality of cameras of a visual media recording device, combining the multiple visual media post-capture into a single visual output that includes at least a portion of the content of each of the multiple visual media, and causing display of the single visual output.

Figure 1B:
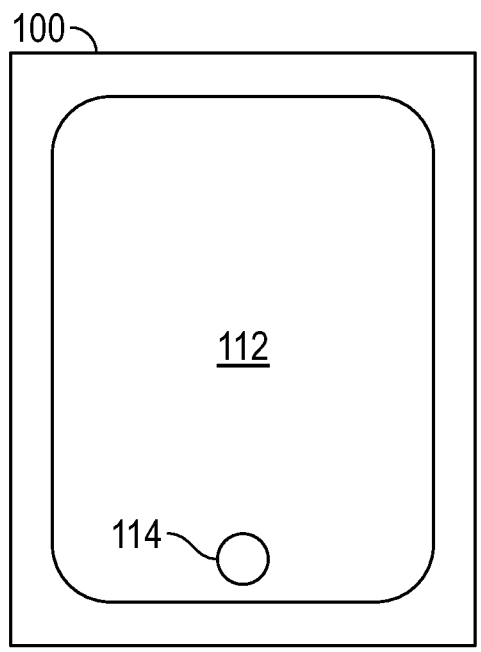

FIGS. 1A and 1B illustrate a visual media recording device 100 having a plurality of cameras 116, 118, according to certain aspects of the disclosure. Though the visual media recording device 100 of FIG. 1 is illustrated as having a first camera 116 and a second camera 118, it will be understood by those having ordinary skill in the relevant art that visual media recording devices having any number of cameras in excess of one may be utilized in accordance with aspects of the subject technology. In some aspects, the visual media recording device 100 may comprise a mobile cellular device that is, at least in part, configured for recording visual media (e.g., images and/or videos, or the like).

FIG. 1A illustrates a rear view of the visual media recording device 100 showing the back side 110 of the device 100 (that is, the side of the visual media recording device 100 that generally is oriented to face away from a user when the visual media recording device 100 is in operation and being held by (or otherwise utilized by) the user). As illustrated, at least a portion of the plurality of cameras 116, 118 is visible when viewing the back side 110 of the visual media recording device 100.

FIG. 1B illustrates a front view of the visual media recording device 100 showing the front side 112 of the device 110 (that is, the side of the visual media recording device 100 that generally is oriented to face toward a user when the visual media recording device 100 is in operation and being held by (or otherwise utilized by) the user). As illustrated, an awake button 114 is visible when viewing the front side 112 of the visual media recording device 110.

Figure 2:
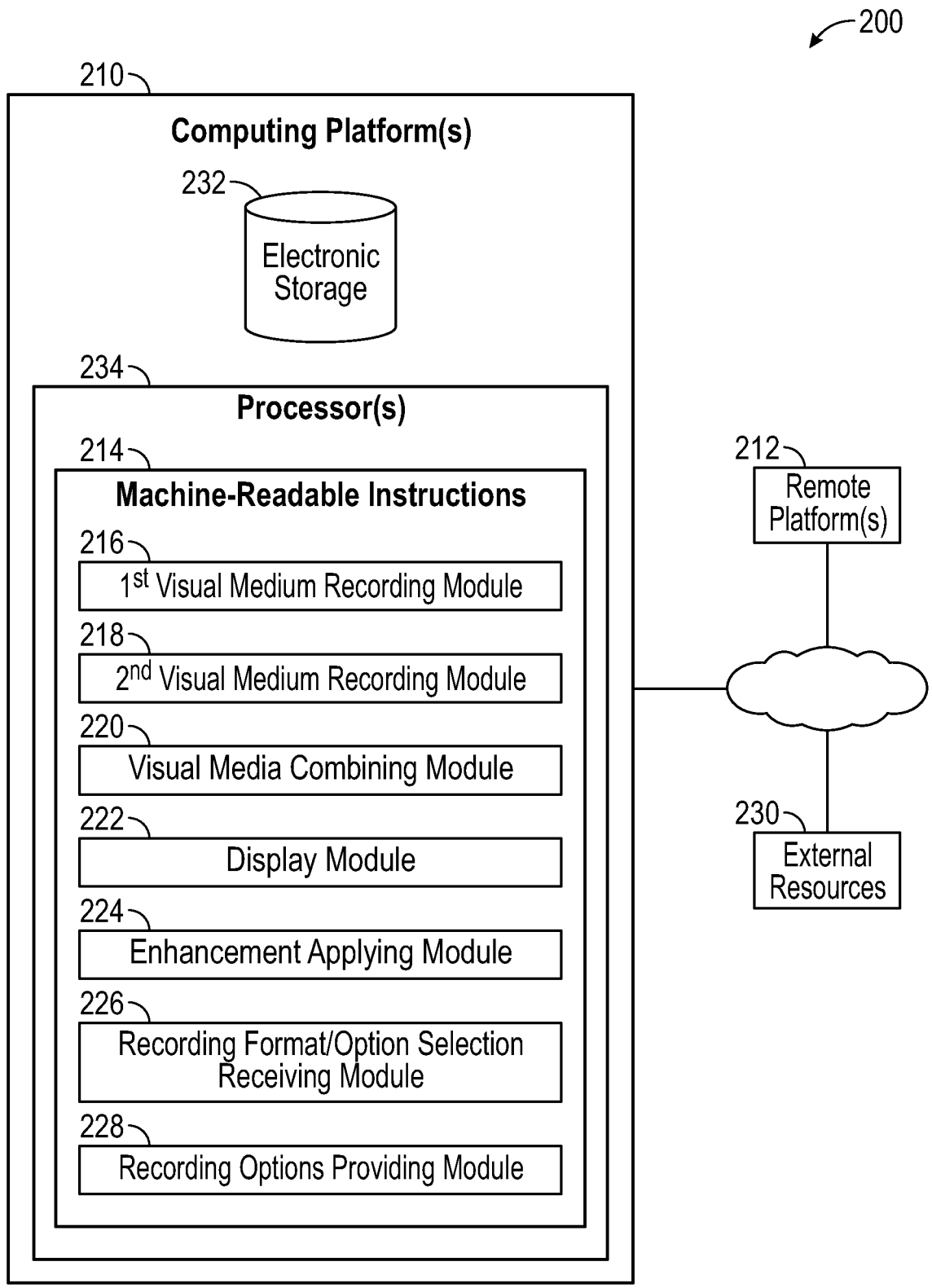
FIG. 2 illustrates a system configured for simultaneously recording multiple visual media utilizing at least a portion of a plurality of cameras of a visual media recording device (e.g., the visual media recording device shown in FIG. 1), in accordance with one or more implementations of the subject technology.

FIG. 2 illustrates an exemplary system 200 configured for simultaneously recording multiple visual media utilizing a plurality of cameras of a visual media recording device (e.g., the first and second cameras 116, 118, respectively, of the visual media recording device 100 of FIG. 1), in accordance with one or more implementations of the subject technology. In some implementations, system 200 may include one or more computing platforms 210. Computing platform(s) 210 may be configured to communicate with one or more remote platforms 212 according to a client/server architecture, a peer-to-peer architecture, and/or other architectures. Remote platform(s) 212 may be configured to communicate with other remote platforms via computing platform(s) 210 and/or according to a client/server architecture, a peer-to-peer architecture, and/or other architectures. Users may access system 200 via remote platform(s) 112.

Computing platform(s) 210 may be configured by machine-readable instructions 214. Machine-readable instructions 214 may include one or more instruction modules. The instruction modules may include computer program modules. The instruction modules may include one or more of first visual medium recording module 216, second visual medium recording module 218, visual media combining module 220, display module 222, enhancement applying module 224, recording format/option selection receiving module 226, recording options providing module 228, and/or other instruction modules.

First visual medium recording module 216 may be configured to record a first visual medium using a first camera of the plurality of cameras of the visual media recording device (e.g., the camera 116 of the visual media recording device 100 of FIGS. 1A and 1B). In aspects, the first camera may be front-facing relative to the visual media recording device (that is, facing the side of the visual media recording device 100 that generally is oriented to face toward a user when the visual media recording device 100 is in operation and being held by the user or being caused to be perched on an object (e.g., a table) that is in front of the user operating the visual media recording device 100).

In aspects, the first camera may include a first camera configuration. In some such aspects, the first camera configuration may include a first zoom lens applied to the first camera.

In aspects, the first camera of the plurality of cameras of the visual media recording device may be configured to record the first visual medium utilizing face-tracking technology during recording. In such aspects, the first camera of the plurality of cameras of the visual media recording device may be configured to maintain the face of the user of the visual media recording device within the view area of the first camera of the plurality of cameras of the visual media recording device even as the visual media recording device is being tilted and maneuvered in space.

Second visual medium recording module 218 may be configured to record, simultaneously with recording of the first visual medium, a second visual medium using a second camera of the plurality of cameras of the visual media recording device (e.g., the camera 118 of the visual media recording device 100 of FIGS. 1A and 1B). In aspects, the second camera may be rear-facing relative to the visual media recording device (that is, facing the side of the visual media recording device 100 that generally is oriented to face away from a user when the visual media recording device 100 is in operation and being held by the user or being caused to be perched on an object (e.g., a table) that is in front of the user operating the visual media recording device 100).

In aspects, the second camera may include a second camera configuration. In some such aspects, the second camera configuration may include a second zoom lens applied to the second camera. In aspects, the first camera configuration and the second camera configuration may be the same camera configuration. In aspects, the first camera configuration and the second camera configuration may differ with respect to one another.

In aspects, the second camera of the plurality of cameras of the visual media recording device may be configured to record the second visual medium utilizing face-tracking technology during recording. In such aspects, the second camera of the plurality of cameras of the visual media recording device may be configured to maintain the face of a subject person within the view area of the second camera of the plurality of cameras of the visual media recording device even as the visual media recording device is being tilted and maneuvered in space.

Visual media combining module 220 may be configured to combine the first visual medium and the second visual medium into a single visual output during a post-recording process. In aspects, the single visual output may include at least a portion of the content of each of the first visual medium and the second visual medium.

Display module 222 may be configured to cause display of the single visual output. In some aspects, the display module 222 may be configured to cause display of an enhanced visual output, as more fully described below. In aspects, the display module 222 may be configured to cause display of the single (and/or enhanced) visual output by posting the single (and/or enhanced) visual output to at least one social media platform. In aspects, the display module 222 may be configured to cause display of the single (and/or enhanced) visual output by causing the single (and/or enhanced) visual output to be shared with a user of a social media platform. In aspects, the display module 222 may be configured to cause display of the single (and/or enhanced) visual output by causing display of the single (and/or enhanced) visual output during a real-time video communication.

Enhancement applying module 224 may be configured to apply at least one enhancement (e.g., a change) to the single visual output to create an enhanced visual output. In aspects, the at least one enhancement to the single visual output may comprise a lighting enhancement to one of the first visual medium and the second visual medium, the lighting enhancement being informed by the other of the first visual medium and the second visual medium. In aspects, the at least one enhancement to the single visual output may comprise enhancing a portion of one of the first visual medium and the second visual medium with a sticker or overlay of at least a portion of the other of the first visual medium and the second visual medium. In aspects, the at least one enhancement to the single visual output may comprise enhancing at least a portion of the content of one of the first visual medium and the second visual medium with a border surrounding the content. In aspects, the at least one enhancement to the single visual output may comprise enhancing at least a portion of the content of one of the first visual medium and the second visual medium by adding one or more virtual objects to the content.

Figure 3:
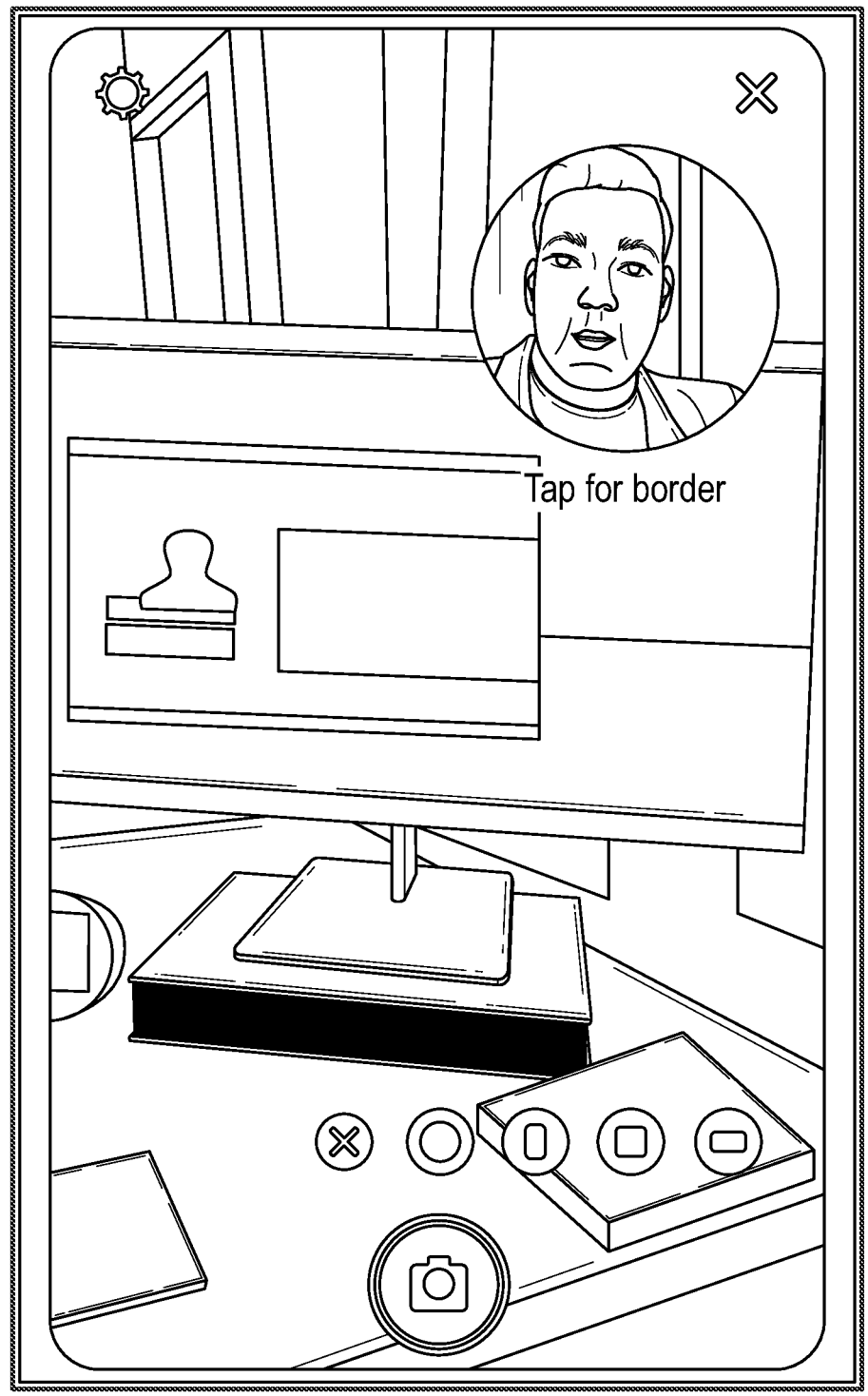
FIGS. 3-5 illustrate exemplary screen displays showing visual outputs, according to certain aspects of the disclosure.

FIG. 3 illustrates a screen display 300 showing an exemplary visual output, according to certain aspects of the disclosure. In the illustrated screen display 300, the exemplary visual output includes at least a portion of the content of a first visual medium covering a majority thereof and at least a portion of the content of a second visual medium surrounded by a border and covering a smaller portion of the exemplary visual output than the content of the first visual medium.

Figure 4:
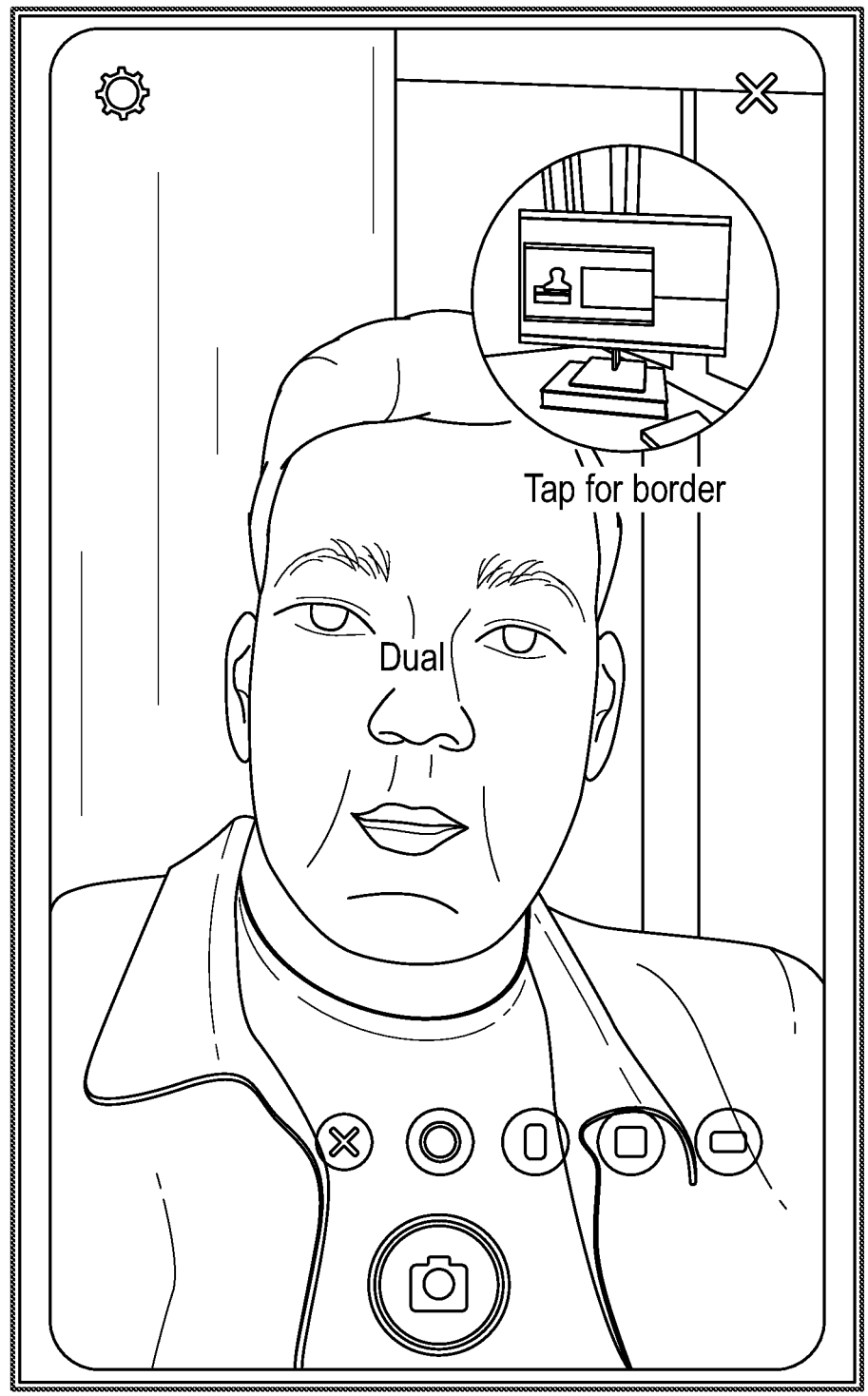

FIG. 4 illustrates a screen display 400 showing an exemplary visual output, according to certain aspects of the disclosure. In the illustrated screen display 400, the exemplary visual output includes the at least a portion of the content of the second visual medium covering a majority thereof and at least a portion of the content of a first visual medium surrounded by a border and covering a smaller portion of the exemplary visual output than the content of the second visual medium. In effect, the content of the first visual medium and the second visual medium are switched as to their coverage and location between the screen display 300 and the screen display 400.

Figure 5:
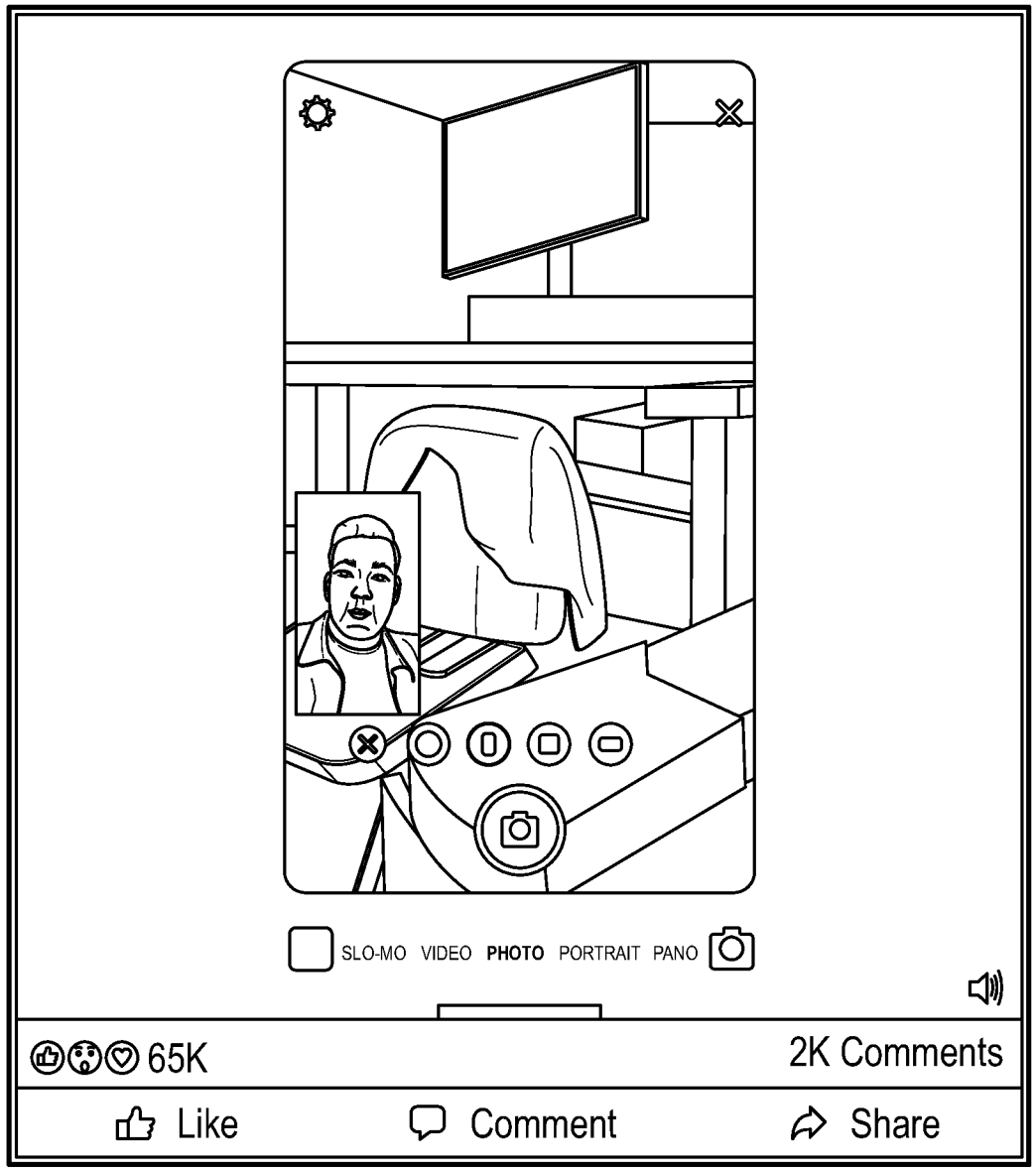

FIG. 5 illustrates a screen display 500 showing an exemplary visual output, according to certain aspects of the disclosure. In the illustrated screen display 300, the exemplary visual output includes at least a portion of the content of a first visual medium covering a majority thereof and at least a portion of the content of a second visual medium surrounded by a border that differs in shape from the border shown in the exemplary screen display 300 of FIG. 3, and covering a smaller portion of the exemplary visual output than the content of the first visual medium.

Recording format/option selection receiving module 226 may be configured to receive a selection of a visual media recording format configured for simultaneously recording visual media utilizing at least a portion of the plurality of cameras of the visual media recording device. In aspects, the recording format/option selection receiving module 226 may be configured to receive a selection of one or more simultaneous recording options. In aspects, the recording format/option selection receiving module 226 may be configured to receive a selection of one or more simultaneous recording options in response to display of a plurality of formats and/or options. In aspects, the plurality of formats and/or options may be based upon the capabilities of the visual media recording device 200. In aspects, the plurality of formats and/or options may be displayed in response to a user query.

Recording options providing module 228 may be configured to provide at least one simultaneous recording option based upon capabilities of the visual media recording device.

In some implementations, computing platform(s) 210, remote platform(s) 212, and/or external resources 230 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 230 may be operatively linked via some other communication media.

A given remote platform 212 may include one or more processors configured to execute computer program modules. The computer program modules may be configured to enable an expert or user associated with the given remote platform 212 to interface with system 200 and/or external resources 230, and/or provide other functionality attributed herein to remote platform(s) 212. By way of non-limiting example, a given remote platform 212 and/or a given computing platform 210 may include one or more of a server, a desktop computer, a laptop computer, a handheld computer, a tablet computing platform, a NetBook, a Smartphone, a gaming console, and/or other computing platforms.

External resources 230 may include sources of information outside of system 200, external entities participating with system 200, and/or other resources. In some implementations, some or all of the functionality attributed herein to external resources 230 may be provided by resources included in system 200.

Computing platform(s) 210 may include electronic storage 232, one or more processors 234, and/or other components. Computing platform(s) 210 may include communication lines, or ports to enable the exchange of information with a network and/or other computing platforms. Illustration of computing platform(s) 210 in FIG. 2 is not intended to be limiting. Computing platform(s) 210 may include a plurality of hardware, software, and/or firmware components operating together to provide the functionality attributed herein to computing platform(s) 210. For example, computing platform(s) 210 may be implemented by a cloud of computing platforms operating together as computing platform(s) 210.

Electronic storage 232 may comprise non-transitory storage media that electronically stores information. The electronic storage media of electronic storage 232 may include one or both of system storage that is provided integrally (i.e., substantially non-removable) with computing platform(s) 210 and/or removable storage that is removably connectable to computing platform(s) 210 via, for example, a port (e.g., a USB port, a firewire port, etc.) or a drive (e.g., a disk drive, etc.). Electronic storage 232 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 232 may include one or more virtual storage resources (e.g., cloud storage, a virtual private network, and/or other virtual storage resources). Electronic storage 232 may store software algorithms, information determined by processor(s) 234, information received from computing platform(s) 210, information received from remote platform(s) 212, and/or other information that enables computing platform(s) 210 to function as described herein.

Processor(s) 234 may be configured to provide information processing capabilities in computing platform(s) 210. As such, processor(s) 234 may include one or more of a digital processor, an analog processor, a digital circuit designed to process information, an analog circuit designed to process information, a state machine, and/or other mechanisms for electronically processing information. Although processor(s) 234 is shown in FIG. 2 as a single entity, this is for illustrative purposes only. In some implementations, processor(s) 234 may include a plurality of processing units. These processing units may be physically located within the same device, or processor(s) 234 may represent processing functionality of a plurality of devices operating in coordination. Processor(s) 234 may be configured to execute modules 216, 218, 220, 222, 224, 226 and/or 228, and/or other modules. Processor(s) 234 may be configured to execute modules 216, 218, 220, 222, 224, 226 and/or 228, and/or other modules by software; hardware; firmware; some combination of software, hardware, and/or firmware; and/or other mechanisms for configuring processing capabilities on processor(s) 234. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 216, 218, 220, 222, 224, 226 and/or 228 are illustrated in FIG. 2 as being implemented within a single processing unit, in implementations in which processor(s) 234 includes multiple processing units, one or more of modules 216, 218, 220, 222, 224, 226 and/or 228 may be implemented remotely from the other modules. The description of the functionality provided by the different modules 216, 218, 220, 222, 224, 226 and/or 228 described below is for illustrative purposes, and is not intended to be limiting, as any of modules 216, 218, 220, 222, 224, 226 and/or 228 may provide more or less functionality than is described. For example, one or more of modules 216, 218, 220, 222, 224, 226 and/or 228 may be eliminated, and some or all of its functionality may be provided by other ones of modules 216, 218, 220, 222, 224, 226 and/or 228. As another example, processor(s) 234 may be configured to execute one or more additional modules that may perform some or all of the functionality attributed below to one of modules 216, 218, 220, 222, 224, 226 and/or 228.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
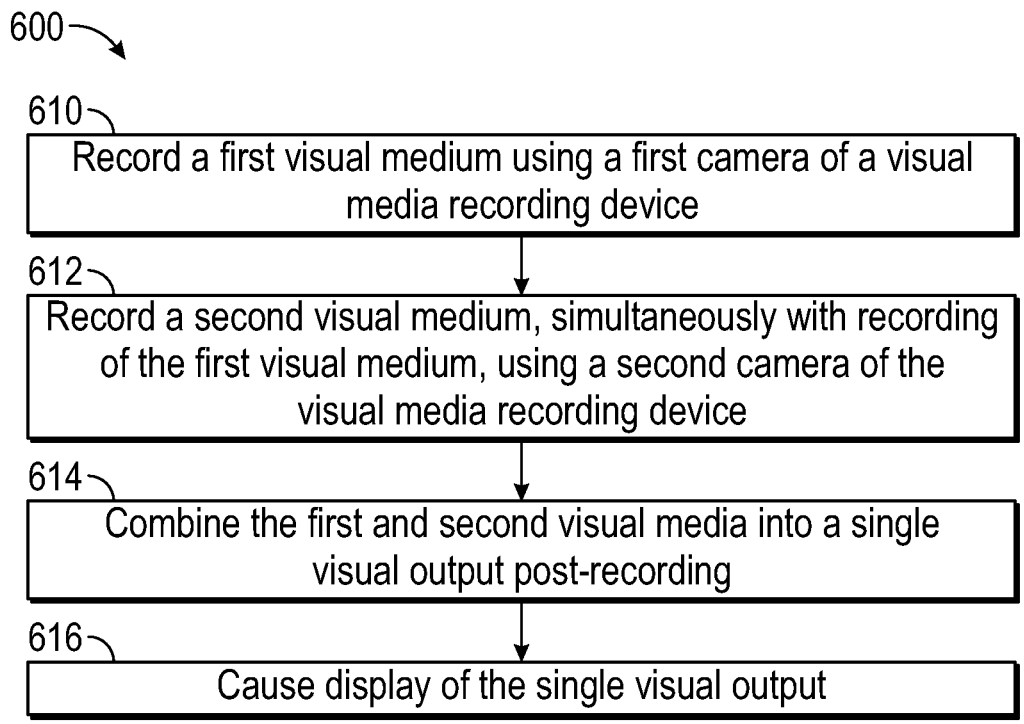
FIG. 6 illustrates an example flow diagram for simultaneously recording multiple visual media utilizing at least a portion of a plurality of cameras of a visual media recording device, according to certain aspects of the disclosure.

FIG. 6 illustrates an example flow diagram (e.g., process 600) for simultaneously recording multiple visual media utilizing a plurality of cameras of a visual media recording device, according to certain aspects of the disclosure. For explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1 and 2.

At step 610, the process 600 may include recording (e.g., utilizing the first visual medium recording module 216 of the computing system 200 of FIG. 2) a first visual medium using a first camera of the plurality of cameras of the visual media recording device (e.g., first camera 116 of the plurality of cameras of the visual media recording device 100 of FIGS. 1A and 1B). In aspects, the first visual medium may be an image, a video, or the like.

At step 612, the process 600 may include recording (e.g., utilizing the second visual medium recording module 218 of the computing system 200 of FIG. 2), simultaneously with recording of the first visual medium, a second visual medium using a second camera of the plurality of cameras of the visual media recording device (e.g., second camera 118 of the plurality of cameras of the visual media recording device 100 of FIGS. 1A and 1B). In aspects, the second visual medium may be an image, a video, or the like.

At step 614, the process 600 may include combining (e.g., utilizing the visual media combining module 220 of the computing system 200 of FIG. 2) the first visual medium and the second visual medium into a single visual output during a post-recording process. In aspects, the single visual output may be an image, a video, or the like.

At step 616, the process 600 may include causing display (e.g., utilizing the display module 222 of the computing system 200 of FIG. 2) of the single visual output. In aspects, causing display may include posting the single visual output to a social media platform. In aspects, causing display may include sharing the single visual output with a user of a social media platform. In aspects, causing display may include displaying the single visual output as a real-time video communication.

Figure 7:
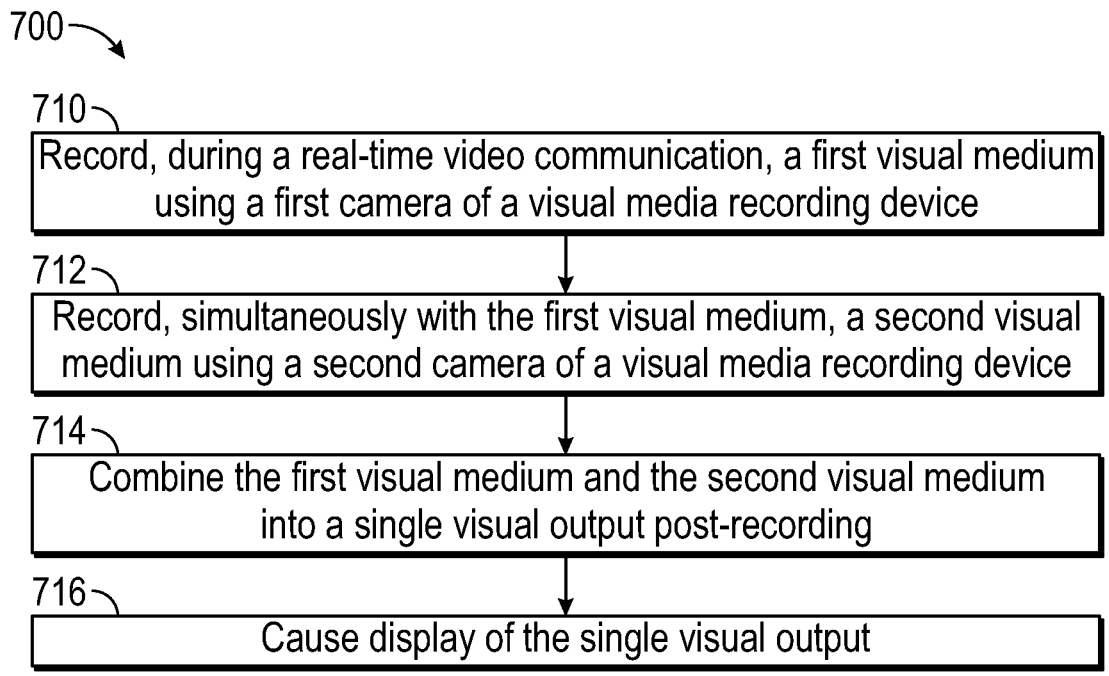
FIG. 7 illustrates an example flow diagram for simultaneously recording multiple visual media during a real-time video communication utilizing at least a portion of a plurality of cameras of a visual media recording device, according to certain aspects of the disclosure.

FIG. 7 illustrates an example flow diagram (e.g., process 700) for simultaneously recording multiple visual media during a real-time video communication utilizing a plurality of cameras of a visual media recording device, according to certain aspects of the disclosure. For explanatory purposes, the steps of the example process 700 are described herein as occurring in serial, or linearly. However, multiple instances of the example process 700 may occur in parallel. For purposes of explanation of the subject technology, the process 700 will be discussed in reference to FIGS. 1A, 1B and 2.

At step 710, the process 700 may include recording (e.g., utilizing the first visual medium recording module 216 of the computing system 200 of FIG. 2), during a real-time video communication, a first visual medium using a first camera of the plurality of cameras of the visual media recording device (e.g., the first camera 116 of the visual media recording device 100 of FIG. 1). In aspects, the first camera may be front-facing relative to the visual media recording device.

At step 712, the process 700 may include recording (e.g., utilizing the second visual medium recording module 216 of the computing system 200 of FIG. 2), simultaneously with recording of the first visual medium during the real-time video communication, a second visual medium using a second camera of the plurality of cameras of the visual media recording device (e.g., the second camera 118 of the visual media recording device 100 of FIG. 1). In aspects, the second camera may be rear-facing relative to the visual media recording device.

At step 714, the process 700 may include combining (e.g., utilizing the visual media combining module 220 of the computing system 200 of FIG. 2) the first visual medium and the second visual medium into a single visual output during a post-recording process.

At step 716, the process 700 may include causing display (e.g., utilizing the display module 222 of the computing system 200 of FIG. 2) of the single visual output. In aspects, causing display may include displaying the single visual output as a real-time video communication, the single visual output including both a view of what is being looked at by a user and the face of the user.

Figure 8:
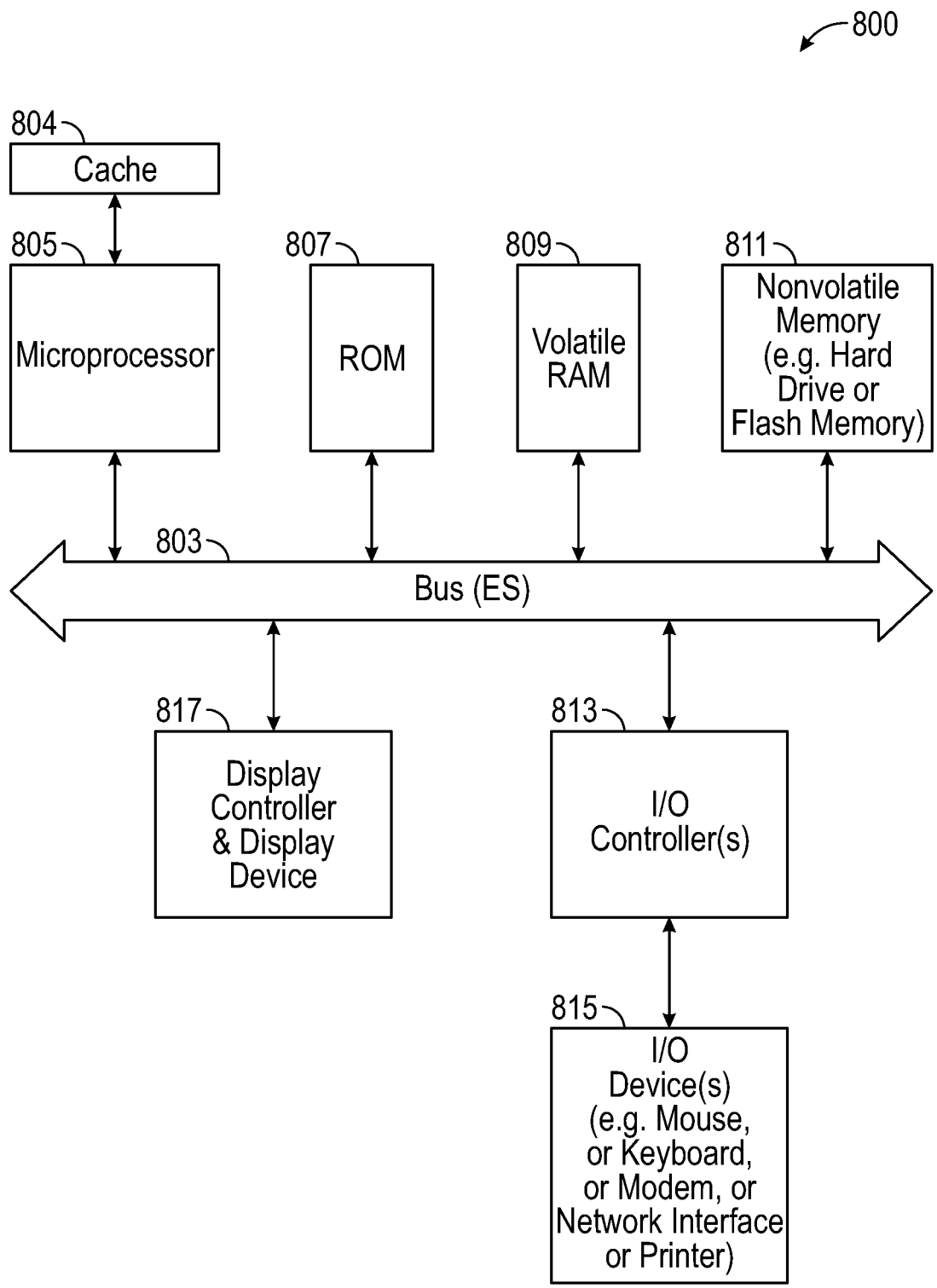
FIG. 8 is a block diagram illustrating an example computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, the above-described gaming systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads data, information may be read from the data and stored in a memory device, such as the memory 804. Additionally, data from the memory 804 accessed via a network the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for simultaneously recording multiple visual media utilizing a plurality of cameras of a visual media recording device, the method comprising:
    recording a first visual medium using a first camera of the plurality of cameras of the visual media recording device;
    recording a second visual medium using a second camera of the plurality of cameras of the visual media recording device, at least one of the first camera and the second camera utilizing face-tracking technology during recording, wherein the recoding of the first visual medium and the second visual medium are captured simultaneously at the visual media recording device by a first user;
    combining the first visual medium and the second visual medium into a single visual output during a post-recording process; and
    displaying the single visual output, wherein the displaying includes maintaining, using face-tracking, the first user in a first view area of the first visual medium and a subject in a second view area of the second visual medium.

2. The computer-implemented method of claim 1, wherein the first camera is front-facing relative to the visual media recording device and the second camera is rear-facing relative to the visual media recording device.

3. The computer-implemented method of claim 1, wherein the first camera is configured to record the first visual medium utilizing a first camera configuration and the second camera is configured to record the second visual medium utilizing a second camera configuration that differs from the first camera configuration.

4. The computer-implemented method of claim 1, wherein the first camera configuration includes a first zoom lens applied to the first camera and the second camera configuration includes a second zoom lens applied to the second camera that differs from the first zoom lens.

5. The computer-implemented method of claim 1, further comprising:
    applying at least one enhancement to the single visual output to create an enhanced visual output,
    wherein causing display of the single visual output comprises causing display of the enhanced visual output.

6. The computer-implemented method of claim 5, wherein the at least one enhancement to the single visual output comprises at least one of (i) a lighting enhancement to one of the first visual medium and the second visual medium, the lighting enhancement being informed by the other of the first visual medium and the second visual medium, and (ii) a border enhancement to at least a portion of content of the first visual medium or the second visual medium with a border surrounding the content.

7. The computer-implemented method of claim 1, wherein causing display of the single visual output comprises causing the single visual output to be at least one of posted to at least one social media platform or shared with a user of a social media platform.

8. The computer-implemented method of claim 1, further comprising:
receiving a selection of a visual media recording format configured for simultaneously recording visual media utilizing at least a portion of the plurality of cameras of the visual media recording device.

9. The computer-implemented method of claim 1, further comprising:
providing at least one simultaneous recording option based upon capabilities of the visual media recording device; and
receiving a selection of one of the at least one simultaneous recording options.

10. The computer-implemented method of claim 1, wherein each of the first visual medium and the second visual medium is one of an image or a video.

11. A system configured for simultaneously recording multiple visual media using a plurality of cameras of a visual media recording device, the system comprising:
one or more hardware processors configured by machine-readable instructions to:
record, during a real-time video communication, a first visual medium using a first camera of the plurality of cameras of the visual media recording device, the first camera being front-facing relative to the visual media recording device;
record, simultaneously with recording of the first visual medium during the real-time video communication, a second visual medium using a second camera of the plurality of cameras of the visual media recording device, the second camera being rear-facing relative to the visual media recording device;
combine the first visual medium and the second visual medium into a single visual output during a post-recording process; and
display the single visual output, wherein the display includes maintaining, using face-tracking, the first user in a first view area of the first visual medium and a subject in a second view area of the second visual medium.

12. The system of claim 11, wherein the one or more hardware processors further are configured by the machine-readable instructions to:
apply at least one enhancement to the single visual output to create an enhanced visual output; and
cause display of the enhanced visual output.

13. The system of claim 11, wherein the one or more hardware processors further are configured by the machine-readable instructions to:
receive a selection of a visual media recording format configured for simultaneously recording visual media using at least a portion of the plurality of cameras of the visual media recording device.

14. The system of claim 11, wherein the one or more hardware processors further are configured by the machine-readable instructions to:
provide at least one simultaneous recording option based upon capabilities of the visual media recording device; and
receive a selection of one of the at least one simultaneous recording options.

15. The system of claim 11, wherein the first camera of the plurality of cameras of the visual media recording device records the first visual medium utilizing face-tracking technology during recording.

16. The system of claim 11, wherein each of the first visual medium and the second visual medium is one of an image or a video.

17. A non-transient computer-readable storage medium having instructions embodied thereon, the instructions being executable by one or more processors to perform a method for simultaneously recording multiple visual media using a plurality of cameras of a visual media recording device, the method comprising:
recording a first visual medium using a first camera of the plurality of cameras of the visual media recording device;
recording a second visual medium using a second camera of the plurality of cameras of the visual media recording device, at least one of the first camera and the second camera utilizing face-tracking technology during recording, wherein the recoding of the first visual medium and the second visual medium are captured simultaneously at the visual media recording device by a first user;
combining the first visual medium and the second visual medium into a single visual output during a post-recording process; and
displaying the single visual output, wherein the displaying includes maintaining, using face-tracking, the first user in a first view area of the first visual medium and a subject in a second view area of the second visual medium.

18. The computer-readable storage medium of claim 17, wherein the first camera is front-facing relative to the visual media recording device and the second camera is rear-facing relative to the visual media recording device.

19. The computer-readable storage medium of claim 17, wherein the first camera is configured to record the first visual medium utilizing a first camera configuration and the second camera is configured to record the second visual medium utilizing a second camera configuration that differs from the first camera configuration.

20. The computer-readable storage medium of claim 17, wherein the method further comprises:
applying at least one enhancement to the single visual output to create an enhanced visual output,
wherein causing display of the single visual output comprises causing display of the enhanced visual output.

* * * * *